United States Patent [19]

Crouch, Jr. et al.

[11] Patent Number: 5,578,915
[45] Date of Patent: Nov. 26, 1996

[54] DYNAMIC BATTERY STATE-OF-CHARGE AND CAPACITY DETERMINATION

[75] Inventors: Dell A. Crouch, Jr.; Tracy F. Strickland, both of Noblesville, Indiana

[73] Assignee: General Motors Corporation, Detroit, Mich.

[21] Appl. No.: 311,991

[22] Filed: Sep. 26, 1994

[51] Int. Cl.$^6$ ................................................. H02J 7/04
[52] U.S. Cl. ............................ 320/48; 320/32; 324/426
[58] Field of Search ................................. 320/6, 32, 39, 320/48; 324/426, 427

[56] References Cited

U.S. PATENT DOCUMENTS

| | | | |
|---|---|---|---|
| 4,595,880 | 6/1986 | Patil | 324/427 |
| 5,107,191 | 4/1992 | Lowndes et al. | 318/139 |
| 5,432,429 | 7/1995 | Armstrong, II et al. | 320/43 |
| 5,473,262 | 12/1995 | Yoshimatsu | 324/771 |

*Primary Examiner*—Peter S. Wong
*Assistant Examiner*—Gregory J. Toatley, Jr.
*Attorney, Agent, or Firm*—Vincent A. Cichosz

[57] ABSTRACT

A battery pack comprising a plurality of series arranged module has a state-of-charge and capacity associated therewith that are determined through dynamic operation thereof including both charge and discharge cycling. Amp*hour integration techniques are used to update state-of-charge until one of the plurality of modules is deeply discharged, at which time state-of-charge is updated in accordance with measured dynamic battery parameters of the deeply discharged module and capacity is updated in accordance with the newly calculated state-of-charge thereby accounting for capacity loss throughout the pack's cycle life. Alternatively, amp*hour integration techniques are used only at relatively high states of charge and dynamic parameter techniques are employed thereafter.

13 Claims, 3 Drawing Sheets

DYNAMIC BATTERY STATE-OF-CHARGE AND CAPACITY DETERMINATION

BACKGROUND OF THE INVENTION

This invention is directed toward a method and apparatus for determining the state-of-charge and capacity of an electrochemical battery system. More precisely, a method and apparatus particularly suitable for use in systems characterized by widely varying discharge currents and discharge rates, widely varying operating temperatures, deep discharges, and frequent recharging.

In application to electric vehicles, it is particularly desirable to indicate to a vehicle operator the useful remaining energy of the motive battery system and/or range available therefrom in a fashion much analogous to a fuel gage and/or range gage in a conventional internal combustion powered vehicle. This information will of course inform the operator when the capacity of the motive battery system is nearing depletion thereby necessitating a recharge in order to avoid operator inconvenience and/or irreversible battery damage. A further need exists for such information at the system level so that efficient recharging can be performed based upon the motive battery system present state-of-charge and capacity.

Prior art ampere-hour integration techniques have been used to indicate battery state-of-charge but fall short of accurately predicting state-of-charge in vehicle specific applications which are characterized by dynamic battery capacities related to varying discharge current magnitude and rates as well as variable temperature operating conditions. Prior art battery terminal voltage techniques have also been utilized to indicate battery state-of-charge but are expensive due to the precision voltage measurements required and suffer from implementation problems into a dynamic system since they typically require open circuit, near zero current, voltage measurements thereby requiring operative interruption. Additionally, after termination or interruption of current flow for terminal voltage measurements, the polarization voltage decay time constant would be on a much greater order of magnitude than any practical period through which a current interruption could be tolerated during any dynamic electrical vehicle operation or expedient recharging cycle, thereby resulting in inaccuracies attributable thereto.

SUMMARY OF THE INVENTION

Therefore, one object of the present invention is to determine battery state-of-charge and capacity for motive batteries used in electric vehicle applications.

Another object of the present invention to determine battery state-of-charge and capacity in a fashion which accounts for discharge and recharge cycles and rates.

A further object is to determine battery state-of-charge and capacity without interruption of any discharge or recharge cycling.

In accordance with these objects and advantages which will become apparent from the following description and appended claims, a method for determining a battery state-of-charge and capacity includes the step of determining respective terminal voltages of individual modules comprising a series string battery pack and determining therefrom the minimum module voltage. The series current flowing through the battery pack is likewise determined and a voltage threshold is established as a function thereof. Battery state-of-charge is then established as a function of one of (a) time integration of the series current and predetermined battery capacity, and (b) the series current and minimum module voltage.

According to another aspect of the present invention, changes in battery capacity over time and cycles are accounted for and updated when battery state-of-charge is established as a function of series current and minimum module voltage. Yet another aspect of the invention provides for temperature normalization of the minimum module voltage for establishing temperature correction to any determined state-of-charge and capacity.

DETAILED DESCRIPTION OF THE DRAWINGS

Figure 1:
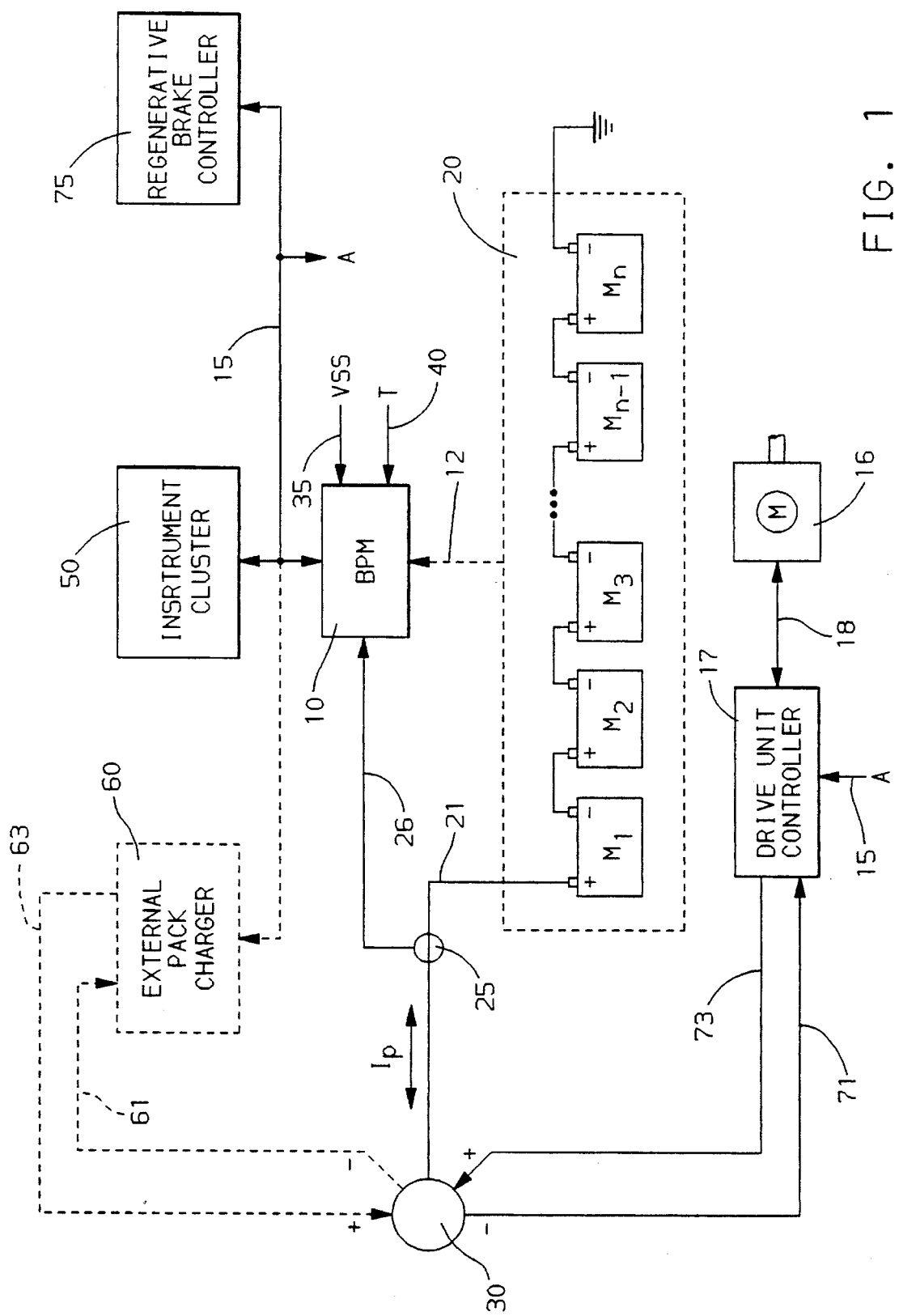
FIG. 1 illustrates schematically a computer based system for implementing the method in accordance with the present invention.

Referring first to FIG. 1, a computer based apparatus is schematically illustrated for carrying out various functions for dynamically determining battery state-of-charge and capacity. Central to the apparatus is microcomputer 10, also referred to herein as Battery Pack Module or BPM. The BPM comprises a CPU, clock, ROM, RAM, discrete I/O ports including D/A and A/D ports as required. Additionally, serial communication via serial data link 15 provides means for external device communication, control and data transfer.

Battery pack 20 comprises a series arrangement of n individual modules enclosed by the dashed line. The battery pack is used exclusively as a propulsion power source for powering drive unit 16. Any vehicle accessories are preferably powered by other battery systems and are not related to the present battery pack. In the present application to electric vehicle propulsion, the preferred module comprises a conventional starved electrolyte lead-acid 12 volt battery.

Certain of the input ports are dedicated to reading terminal voltage values V1–Vn corresponding to similarly subscript identified individual modules M1–Mn as generally illustrated. Battery pack voltage data lines which interface the individual module voltages with the input ports of BPM as heretofore described are collectively labeled with the numeral 12 in the figure. These lines interface internal the BPM with buffer and A/D conversion circuitry and are preferably multiplexed to such A/D circuitry for reasons of circuital and cost efficiency. A single input port is shown coupled to current sensor 25 for inputting magnitude and direction of series current Ip through battery pack 20. Current sensor 25 may be of any well known type such as for example a precision resistor current shunt. Current flow out of the battery pack is discharge current and current flow into the battery pack is charge current.

Sources of charge current include off-vehicle current sources such as external pack charger 60 or on-vehicle regenerative braking source. Regenerative braking source comprises drive unit 16 adapted for negative torque operation as an electrical generator, the raw power output of which interfaces with drive unit controller 17 via power link 18. The raw power output is conditioned and controlled by drive unit controller 17 which receives control inputs from regenerative brake controller 75 via serial data link 15. Drive unit controller 17 comprises power electronics including power conversion and current limiting electronics. Discharge currents are delivered to drive unit controller for powering drive unit 16 or may encompass discharge currents through external pack charger 60 to facilitate maximum energy replacement recharge or charge equalization in accordance with charge methods beyond the scope of the present invention.

Node 30 is exaggerated to illustrate the relationship among certain mutually exclusive charge currents which flow into the node via power distribution lines 63 or 73 algebraically labeled (+), or discharge currents which flow out of the node via power distribution lines 61 or 71 algebraically labeled (−). In the present application, any of the various non-exhaustive exemplary currents are mutually exclusive in as much as only one of the four will have magnitude at any given time. In explanation, if the external battery pack charger 60 is operatively coupled with the vehicle via serial data link 15 and lines 61 and 63, then propulsion and regenerative functions are not active and therefore no current is carried in power distribution lines 71 and 73 and power distribution line 61 and 63 will be operative in accordance with control of external pack charger 60. Similarly, if the vehicle is traveling then it is not coupled with external pack charger 60 and therefore no current is carried by power distribution lines 61 and 63 and power distribution lines 71 and 73 will be operative in accordance with control of drive unit controller 17 and regenerative braking controller 75. Additionally, with respect to the power distribution line pairs (61,63) or (71,73) corresponding respectively to external pack charger 60 and drive unit controller 70, only one power distribution line of the operative pair may be operatively coupled with battery pack 20 via line 21 at any given time. The battery pack current Ip therefore is instantaneously equivalent in magnitude and direction to the current in the active power distribution line. Charging current carried by line 21 will be assigned the labeling convention "+Ip" and discharge current assigned the labeling convention "−Ip". The battery pack therefore experiences either a net discharge due to −Ip, a net charge +Ip or no net charge/discharge in the case where the magnitude Ip is zero.

Other inputs to BPM include a vehicle speed sensor (VSS) input on line 35 such as from a conventional variable reluctance rotation sensor and a temperature signal input on line 40 such as from a distributed arrangement of conventional thermistors which represents the aggregate battery pack temperature. Multiple thermistors are preferably utilized to account for temperature gradients in the battery pack arrangement. For example, modules to the outside of a pack may exhibit lower temperatures than those toward the interior of a pack and modules on an upper tier will generally exhibit higher temperatures than those below. Outputs from BPM are preferably via serially communicated data via serial data link 15 and include driver information such as battery pack state-of-charge (fuel gage & low charge warning) and range remaining displayed via instrument cluster 50. Additionally, outputs to an off-vehicle battery pack charger 60 for controlling battery pack reenergization and on-vehicle regenerative brake controller 75 for brake energy reclamation are shown.

Figure 2:
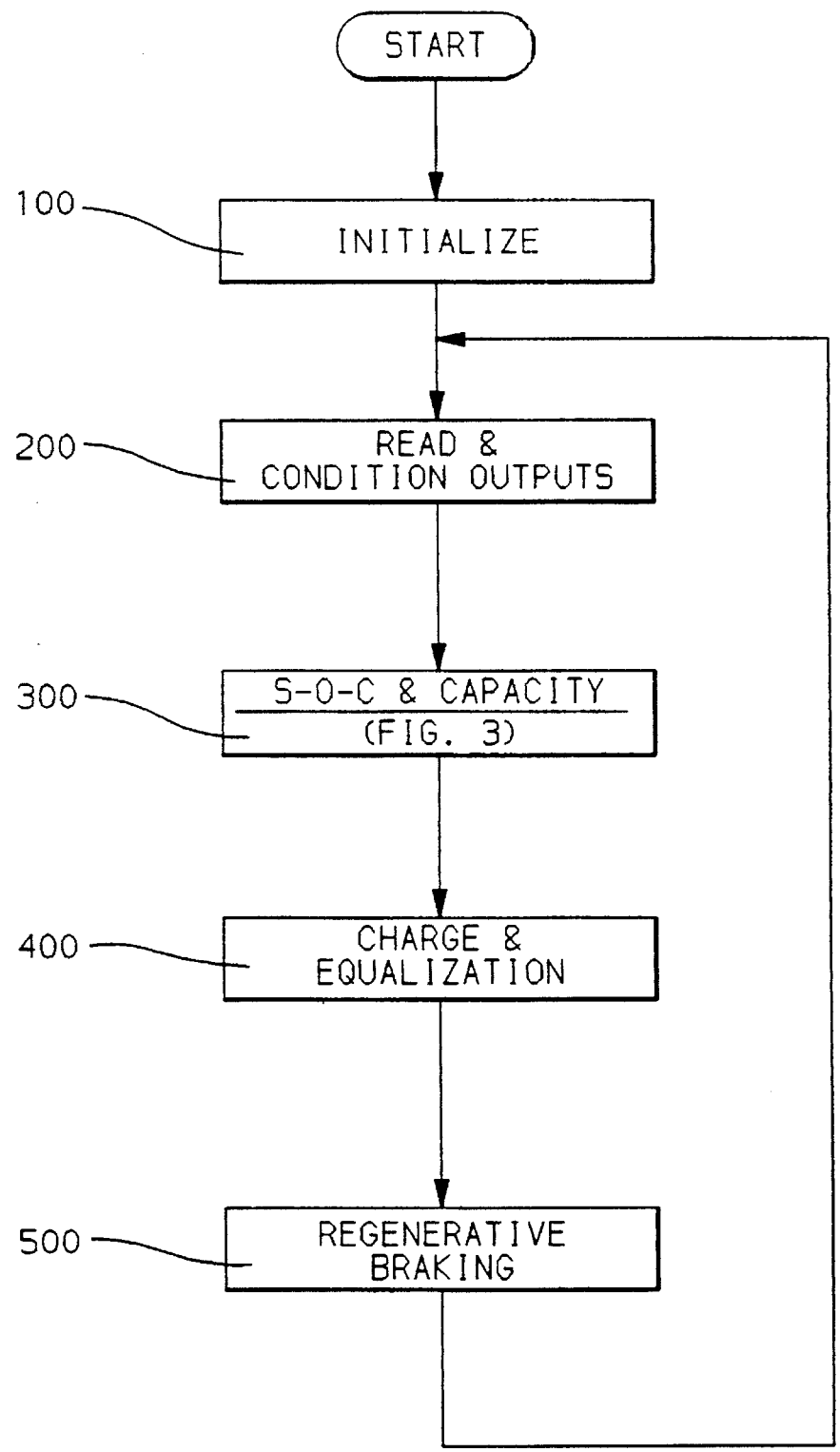
FIGS. 2–3 illustrate a flow charts representative of program steps executed by the apparatus as illustrated in FIG. 1 for carrying out the method in accordance with the present invention.
Figure 3:
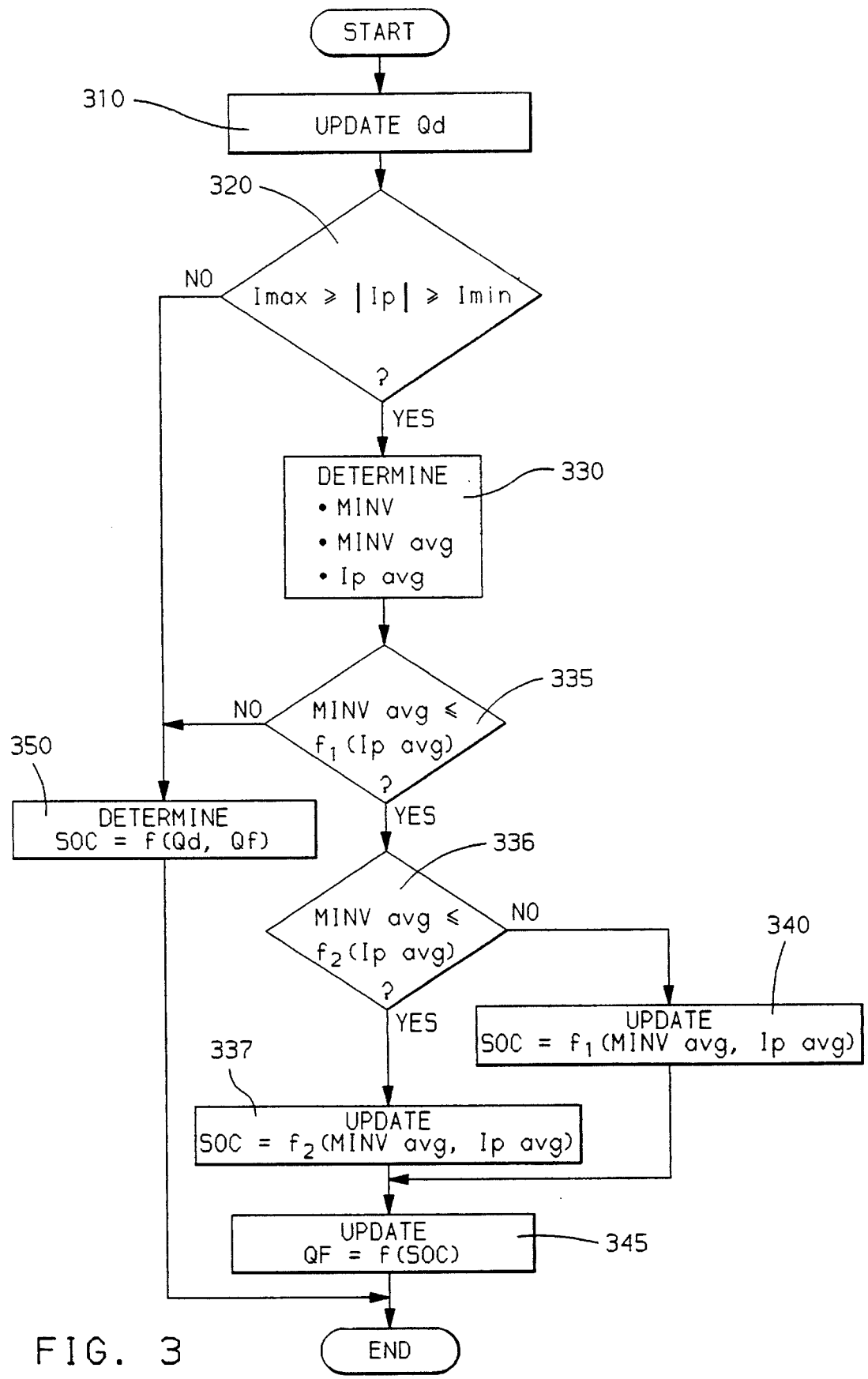

FIGS. 2–3 depict flow diagrams representative of computer program instructions executed by the BPM of FIG. 1 in carrying out the control of the present invention. The flow diagram of FIG. 2 represents an executive or main loop program which directs the operation of a number of subroutines for performing various tasks. The flow diagram of FIG. 3 represents the routine which are pertinent to the control functions of this invention as indicated in FIG. 2.

With reference to the main loop flow diagram illustrated in FIG. 2, the numeral 100 generally designates a series of program instructions executed at the initiation of each period of vehicle operation for initializing various registers, timers, flags, counters, etc. stored in the BPM. Thereafter, instruction blocks 200–500 are repeatedly and sequentially executed as indicated by the flow diagram lines.

At block 200, the BPM reads and conditions the various input signals as described in reference to FIG. 1, performing A/D conversions, filtering, conditioning, etc. At block 300, battery pack state-of-charge "SOC" and battery pack capacity are determined including allowances for motive discharges at various rates, life cycle degradations, off-board charging periods and on-board charging via braking energy reclamation during periods of regenerative braking. Such determinations are set forth in further detail in the flow diagram of FIG. 3 as indicated. Block 400 refers to control steps for charge restoral to and equalization between the multiple modules comprising the battery pack during periods of off-board charging for maximizing charge restoration and extending battery life. Further details in this regard are beyond the scope of the present invention and are not necessary for understanding and practicing the present invention. Block 500 refers to the control of appropriate levels of on-board charging during periods of vehicle braking, more specific details of which are not necessary for understanding and practicing the present invention.

Design battery capacity is quantified as the sustained current that the battery will deliver over a given period of time after which the battery is considered to be fully discharged. Such capacity designations are made in accordance with well known measurement techniques and yield a battery's conventional ampere*hour (A*hr) rating. Therefore, reference to capacities, whether design capacity or other dynamically determined measurement of capacity, for the purpose of this disclosure will follow A*hr convention.

Referring now to FIG. 3, block 310 is first encountered where an update of the battery cumulative capacity removed (Qd) of the present battery pack. In application, Qd is updated in accordance with the frequency of the update where an instantaneous series current measurement (±Ip) in amperes is integrated over the sampling rate to yield an incremental capacity change whose algebraic sign indicates charge restoration (+) or depletion (−). Each incremental capacity change is then integrated with prior incremental capacity changes to yield the cumulative capacity removed (Qd). For example, if step 310 is executed in accordance with a one second period (i.e. within a 1 second loop), an instantaneous series current measurement of ±Ip yields an incremental capacity change measurement according to the conversion:

$$(\pm Ip\ A * 1s) * (1\ hr/3600s) = \pm Ip/3600\ A * hr \tag{1}$$

Cumulative capacity removed Qd is therefore the result of A*hr integration of the incremental capacity changes. In practice, the integration is performed by continual summation of the incremental capacity changes. Incremental capacity changes result from both charge and discharge currents respectively provided through off-board and on-board regenerative recharges or removed through off-board recharge and drive unit controller for powering the drive unit.

Block 320 is next encountered and represents steps associated with determining whether the instantaneous series current measurement in the present loop is, in magnitude, within a predetermined range. The predetermined range represents current limits associated with the limits of regressions used to empirically determine coefficients for multivariable equations for calculating the state-of-charge directly from the voltage of the module having the minimum voltage and the series current. Regression limits were chosen in the present embodiment to encompass those currents expected throughout 80–90 percent of the vehicle operation. Currents in the range from about 5 to about 100 amperes provide the regression limits for the present embodiment. Additionally, the accuracy of the equation is greater with tighter regression limits so it is in the interest of the designer to limit the regression range of currents while at the same time encompassing as wide a range of driving conditions as reasonably anticipated. Assuming that the instantaneous series current is outside of the range in block 320, processing passes to block 350 for determination of state-of-charge. Block 350 shows the determination of state-of-charge to be a function of a predetermined capacity quantity (Qf) and the cumulative capacity removed Qd. Qf represents the battery capacity at a full, or 100% state-of-charge and is hereafter referred to as full capacity Qf. Initially, the full capacity Qf value is set to the design capacity of a typical module used in the system. State-of-charge in the present branch is calculated directly from the two quantities Qf and Qd in accordance with the formula:

$$SOC=(Qf-Qd)/Qf \quad (3)$$

which yields the state-of-charge as the ratio of charge not removed to a full charge. The routine exits from block 350 to the background routine.

Assuming that the instantaneous series current is within the range in block 320, processing passes to block 330 for determination of the weakest module's voltage, and average quantities of minimum module voltage and series current. In practice, the individual terminal voltage values V1–Vn respectively corresponding to individual modules M1–Mn as read into BPM 10 and the lowest magnitude reading determines the weakest module. Preferably, the lowest magnitude reading is temperature compensated to normalize the reading to a predetermined temperature and the value MINV is thereby established for use in later steps. An exemplary equation for providing temperature compensation takes the form:

$$MINV=MINV+[|Ip|*a(Tr-T)] \quad (2)$$

where Tr represents a predetermined reference temperature at which empirically determined quantities utilized in later discussed equations are determined and T represents the average pack temperature. The coefficient "a" represents the slope of temperature compensation as a ratio of the battery's change in resistance over temperature. All temperatures utilized herein are in Celsius and an exemplary coefficient "a" providing satisfactory temperature compensation results is $6.15*10^{-5}$.

Preferably, an average minimum module voltage and an average series current over a finite number of sequential samples are utilized in the remaining steps of block 340 and 345 to reduce the volatility that instantaneous data readings may introduce into calculations performed in those steps. One manner of accomplishing averaging for the quantities MINV and Ip, and the manner of choice in the present embodiment, is to establish a stack of the last "n" readings. As a new reading is placed on the stack, the most historical reading is removed. The average is then of course simply calculated from the stack values of the respective stacks. The present embodiment uses a stack "n" of ten readings. Average minimum module voltage is expressed as MINV_avg and average series current is expressed as Ip_avg. Block 335 performs steps to determine if the weakest battery has a state of charge greater than a first threshold state of charge by comparing the average minimum module voltage to a first threshold voltage (Vth1) which is a predetermined function of the corresponding average series current. The first threshold is calibrated to represent a point in the state of charge of the battery interfacing a minimally discharged state and a nominally discharged state. Preferably, this threshold represents substantially 80 percent state of charge. The predetermined function equivalent to the voltage threshold Vth1 is a simple linear function of the form:

$$Vth1=a1*Ip\_avg+b1 \quad (4)$$

The threshold voltage is substantially representative of voltages experienced in batteries of the type utilized in the system and empirically determined from batteries discharge at different rates at least in an area of operation surrounding 80 percent state of charge. The actual selection of the battery state-of-charge that constitutes the threshold between minimal and nominal states of charge is determined by the designer and will in turn determine the slope coefficient "a" and intercept coefficient "b" of the equation. Exemplary values for the coefficient and intercept are as follows:

a1=0.0073 b1=12.52

Where the average minimum module voltage MINV_avg is greater than the first voltage threshold as determined as a function of average series current Ip_avg, then the battery is assumed to have been only minimally discharged, and state-of-charge is adequately determined by the steps represented by block 350 as previously discussed.

Assuming that the steps of block 335 determine that the battery is at least nominally discharged, then block 336 performs steps to determine if the weakest battery has a state of charge greater than a second threshold state of charge by comparing the average minimum module voltage to a second threshold voltage (Vth2) which is a predetermined function of the corresponding average series current. The second threshold is calibrated to represent a point in the state of charge of the battery interfacing a nominally discharged state and a highly discharged state. Preferably, this threshold represents substantially 20 percent state of charge. The predetermined function equivalent to the voltage threshold Vth2 is also a simple linear function of the form:

$$Vth2=a2*Ip\_avg+b2 \quad (5)$$

The threshold voltage is substantially representative of voltages experienced in batteries of the type utilized in the system and empirically determined from batteries discharge at different rates at least in an area of operation surrounding 20 percent state of charge. The actual selection of the battery state-of-charge that constitutes the threshold between minimal and nominal states of charge is determined by the designer and will in turn determine the slope coefficient "a2" and intercept coefficient "b2" of the equation. Exemplary values for the coefficient and intercept are as follows:

a2=0.0062 b2=11.63

Where block 336 is negatively answered, a nominally discharged battery state (between substantially 80–20 percent state of charge) is assumed and state of charge is updated at block 340 in accordance with a first complex function of average minimum module voltage and average series current. The function is a complex function of MINV_avg and Ip_avg advantageously having only linear terms therein. Coefficients and offset constant of the function are determined through conventional multi-variable regression of the interrelated MINV_avg and Ip_avg data for the various states-of-charge used for the empirical data gathering. The function takes the form of the equation for state-of-charge (SOC):

$$SOC = a3*Ip\_avg + b3*(MINV\_avg) + c1*Ip\_avg*MINV\_avg + K1 \quad (6)$$

The following coefficient and offset constant values provide satisfactory results and are the preferred values for use in equation (6).

a3=−0.0249
b3=70.3
c1=−0.042
K1=−803

Where block 336 is affirmatively answered, a deeply discharged battery state is assumed (less than substantially 20 percent state of charge) and state of charge is updated at block 337 in accordance with a second complex function of average minimum module voltage and average series current. The function is a complex function of MINV_avg and Ip_avg advantageously having only linear and exponential terms therein. Coefficients and offset constant of the function are determined through conventional multi-variable regression of the interrelated MINV_avg and Ip_avg data for the various states-of-charge used for the empirical data gathering. The function takes the form of the equation for state-of-charge (SOC):

$$SOC = a4*Ip\_avg + b4*MINV\_avg + c2*Ip\_avg*MINV\_avg + d*(MINV\_avg)^2 + K2 \quad (7)$$

The following coefficient and offset constant values provide satisfactory results and are the preferred values for use in equation (7).

a4=0.978
b4=−231.1
c2=−0.105
d=11.4
K2=1161

With state-of-charge having now been determined with respect to dynamic current and voltage relationships which reflect present battery conditions, an update of the full capacity is performed at block 345. By rearranging equation (3) and solving for full capacity Qf, the following relationship is attained:

$$Qf = Qd/(1-SOC) \quad (8)$$

where SOC is the state-of-charge just determined via dynamic battery parameters in one of blocks 337 and 340.

While the invention has been exemplified with respect to a preferred embodiment as disclosed herein, it is contemplated that various modifications and alterations will be apparent to one having ordinary skill in the art and therefore the embodiment is intended to be taken by way of example and not limitation. Accordingly, the invention is intended to embrace all alternatives, modifications and variations which are within the scope of the appended claims.

The embodiments of the invention in which an exclusive property or privilege is claimed are defined as follows:

1. In a rechargeable electrochemical battery system characterized by a series arrangement of multiple electrochemical modules, a method of dynamically determining battery state-of-charge (SOC) comprising the steps of:

determining a minimum module voltage (MINV) from said battery system;

determining a series current (I) through said battery system;

establishing a nominal discharge module threshold voltage (Vth) as a function of said series current (I);

when said series current (I) is outside a predetermined range of current values, determining battery state-of-charge (SOC) as a function of time integrated series current (Qd) and a predetermined battery capacity (Qf); and when said series current (I) is within said predetermined range of current values, determining battery state-of-charge (SOC) as one of a) a function of time integrated series current (Qd) and said predetermined battery capacity (Qf) when said minimum module voltage (MINV) is greater than said nominal discharge module threshold voltage (Vth), and b) a function of series current (I) and minimum module voltage (MINV) when said minimum module voltage (MINV) is not greater than said nominal discharge module threshold voltage (Vth).

2. A method of dynamically determining battery state-of-charge (SOC) as claimed in claim 1 further comprising the steps of:

when determining battery state-of-charge (SOC) as a function series current (I) and minimum module voltage (MINV), establishing a deep discharge module voltage threshold and determining battery state-of-charge as one of (a) a first function of series current (I) and minimum module voltage (MINV) when said minimum module voltage (MINV) is greater than said deep discharge module threshold voltage, and (b) a second function of series current (I) and minimum module voltage (MINV) when said minimum module voltage (MINV) is not greater than said deep discharge module threshold voltage.

3. In a rechargeable electrochemical battery system characterized by a series arrangement of multiple electrochemical modules, a method of dynamically determining battery state-of-charge (SOC) comprising the steps of:

determining a minimum module voltage (MINV) from said battery system;

determining a series current (I) through said battery system;

establishing a first module threshold voltage (vth1) as a function of said series current (I);

establishing a second module threshold voltage (Vth1) as a function of said series current (I);

when said series current (I) is outside a predetermined range of current values, determining battery state-of-charge (SOC) as a function of time integrated series current (Qd) and a predetermined battery capacity (Qf); and when said series current (I) is within said predetermined range of current values, determining battery state-of-Charge (SOC) as one of a) a function of time integrated series current (Qd) and said predetermined battery capacity (Qf) when said minimum module voltage (MINV) is greater than said first module threshold voltage (Vth1), b) a first function of series current (I) and minimum module voltage (MINV) when said minimum module voltage (MINV) is between said first and second module voltages (Vth1,Vth2), and c) a second function of series current (I) and minimum module voltage (MINV) when said minimum module voltage (MINV) is not greater than said second module threshold voltage (Vth2).

4. A method of dynamically determining battery state-of-charge (SOC) as claimed in claim 3 wherein when said battery state-of-charge (SOC) is determined as one of said first and second functions of series current (I) and minimum module voltage (MINV), said series current (I) and said minimum module voltage (MINV) each comprise an average of a predetermined number of respective instantaneous measured values.

5. A method of dynamically determining battery state-of-charge (SOC) as claimed in claim 3 adapted to determine battery capacity (Qf) further comprising the step of:

when said battery state-of-charge (SOC) is determined as one of said first and second functions of series current (I) and minimum module voltage (MINV), determining battery capacity (Qf) as a function of said determined battery state-of-charge (SOC) and said time integrated series current (Qd).

6. A method of dynamically determining battery state-of-charge (SOC) as claimed in claim 3 wherein the step of determining a minimum module voltage includes:

determining the temperature (T) of said battery system; and normalizing said minimum module voltage (MINV) to a predetermined reference temperature.

7. A method of dynamically determining battery state-of-charge (SOC) as claimed in claim 3 wherein said first and second module threshold voltages (Vth1,Vth2) are established in accordance with respective linear functions of said series current (I).

8. A method of dynamically determining battery state-of-charge (SOC) as claimed in claim 3 wherein said predetermined battery capacity (Qf) has an initial value which is a function of the design capacities of the modules.

9. A method of dynamically determining battery state-of-charge (SOC) as claimed in claim 3 wherein:

when said battery state-of-charge (SOC) is determined as said first function of series current (I) and minimum module voltage (MINV), the function takes the form of the equation:

$$(a*Ip\_avg)+(b*MINV\_avg)+(c*Ip\_avg*MINV\_avg)+K$$

wherein a, b, and c represent equation coefficients, K represents an offset, Ip_avg represents an average of a predetermined number of sequential samples of series current (I), and MINV_avg represents an average of a predetermined number of sequential samples of module voltage (MINV).

10. A method of dynamically determining battery state-of-charge (SOC) as claimed in claim 3 wherein:

when said battery state-of-charge (SOC) is determined as said second function of series current (I) and minimum module voltage (MINV), the second function takes the form of the equation:

$$(a*Ip\_avg)+(b*MINV\_avg)+(c*Ip\_avg*MINV\_avg)+(d*(MINV\_avg)^2)+K$$

wherein a, b, c and d represent equation coefficients, K represents an offset, Ip_avg represents an average of a predetermined number of sequential samples of series current (I), and MINV_avg represents an average of a predetermined number of sequential samples of module voltage (MINV).

11. A method of dynamically determining battery state-of-charge (SOC) as claimed in claim 3 wherein said series current (I) is either one of a) discharge current and b) charge current.

12. In a rechargeable electrochemical battery system characterized by a series arrangement of multiple electrochemical modules, an apparatus for dynamically determining battery state-of-charge (SOC) comprising:

means for determining a minimum module voltage (MINV) from said battery system;

means for determining a series current (I) through said battery system;

means for establishing a first module threshold voltage (Vth1) as a function of said series current (I);

means for establishing a second module threshold voltage (Vth2) as a function of said series current (I);

means for determining battery state-of-charge (SOC) as a function of time integrated series current (Qd) and a predetermined battery capacity (Qf) when said series current (I) is outside a predetermined range of current values; and means for determining battery state-of-charge (SOC) when said series current (I) is within said predetermined range of current values as one of:

a) a function of time integrated series current (Qd) and said predetermined battery capacity (Qf) when said minimum module voltage (MINV) is greater than said first module threshold voltage (Vth1), b) a first function of series current (I) and minimum module voltage (MINV) when said minimum module voltage (MINV) is between said first and second module threshold voltages (Vth1,Vth2), and c) a second function of series current (I) and minimum module voltage (MINV) when said minimum module voltage (MINV) is not greater than said second module threshold voltage (Vth2).

13. An apparatus for dynamically determining battery state-of-charge (SOC) as claimed in claim 12 adapted to determine battery capacity (Qf) further comprising:

means for determining battery capacity (Qf) as a function of said determined battery state-of-charge (SOC) and time integrated series current (Qd) when said battery state-of-charge (SOC) is determined as one of said first and second functions of series current (I) and minimum module voltage (MINV).

* * * * *